H. H. SCHIELER.
TRANSMISSION AND STEERING MECHANISM FOR MOTOR DRIVEN VEHICLES.
APPLICATION FILED MAR. 16, 1912.

1,079,607.

Patented Nov. 25, 1913.

6 SHEETS—SHEET 1.

Witnesses:
M. E. Burrell
E. B. Franzoni

Inventor:
H. H. Schieler
By his Attorneys:
Baldwin & Wight

H. H. SCHIELER.
TRANSMISSION AND STEERING MECHANISM FOR MOTOR DRIVEN VEHICLES.
APPLICATION FILED MAR. 16, 1912.
1,079,607.
Patented Nov. 25, 1913.
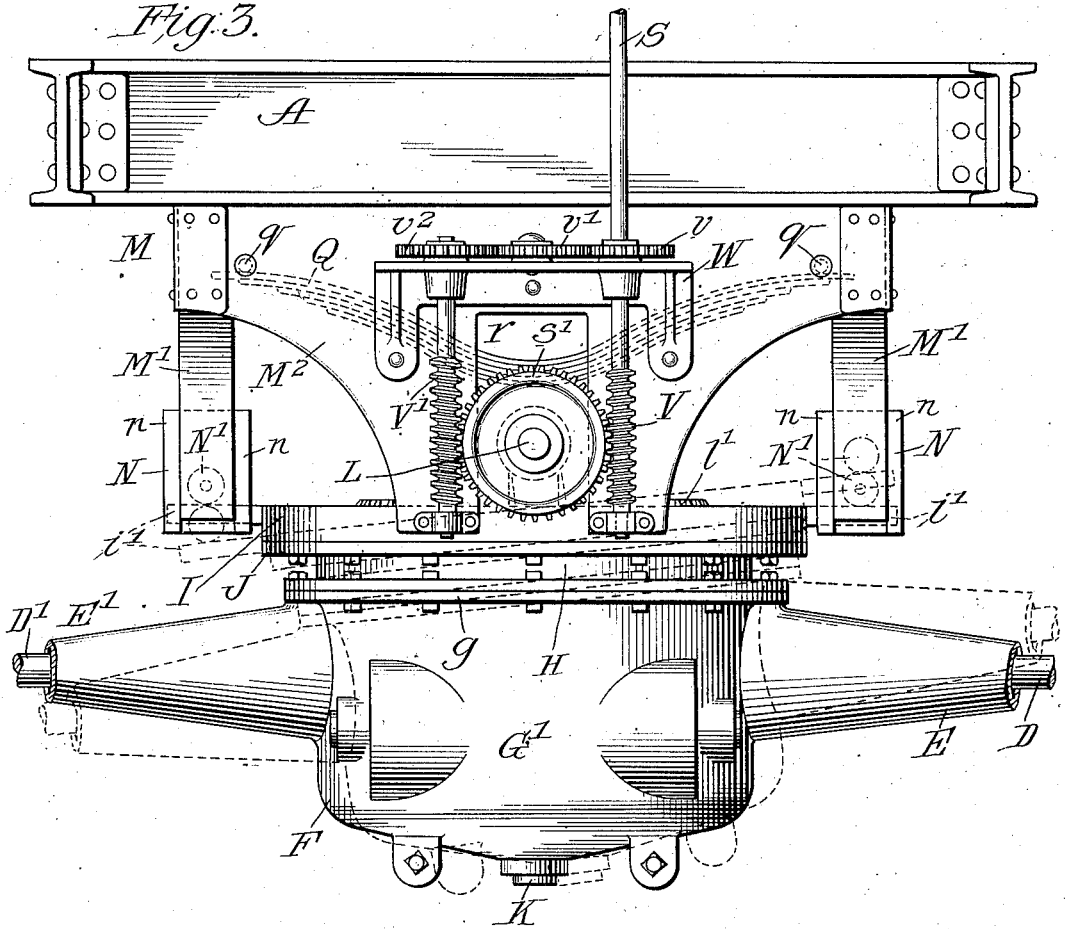
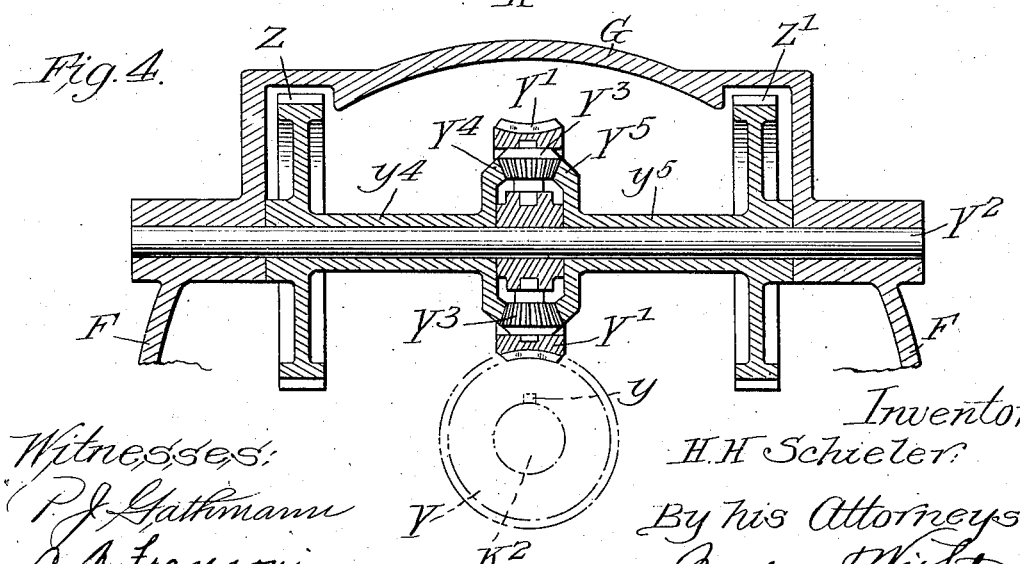

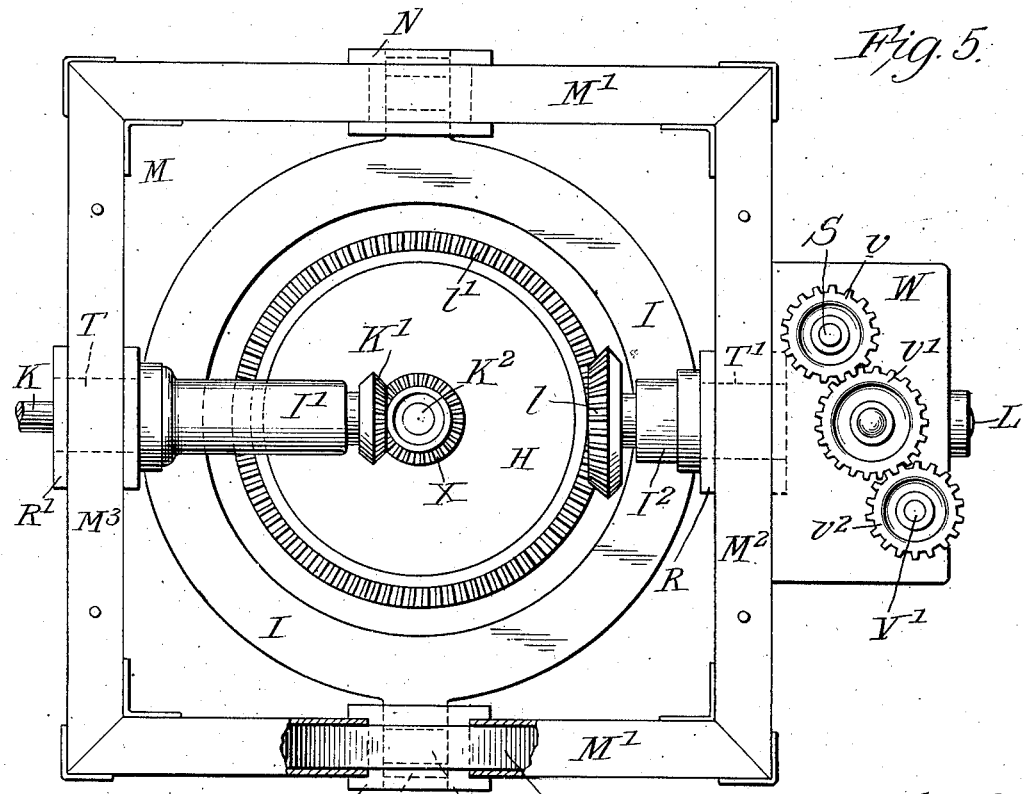
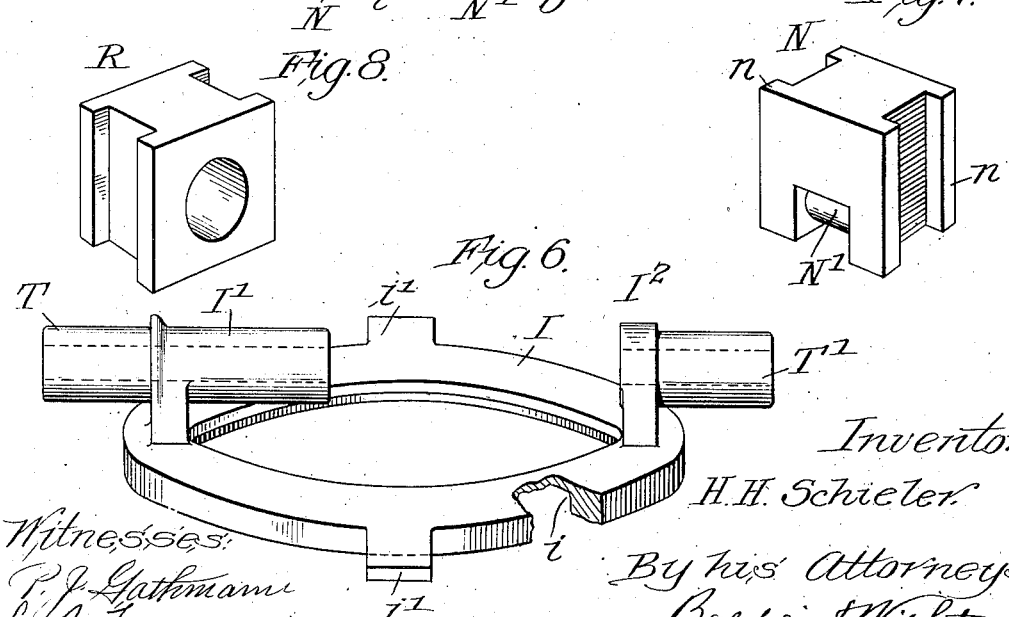

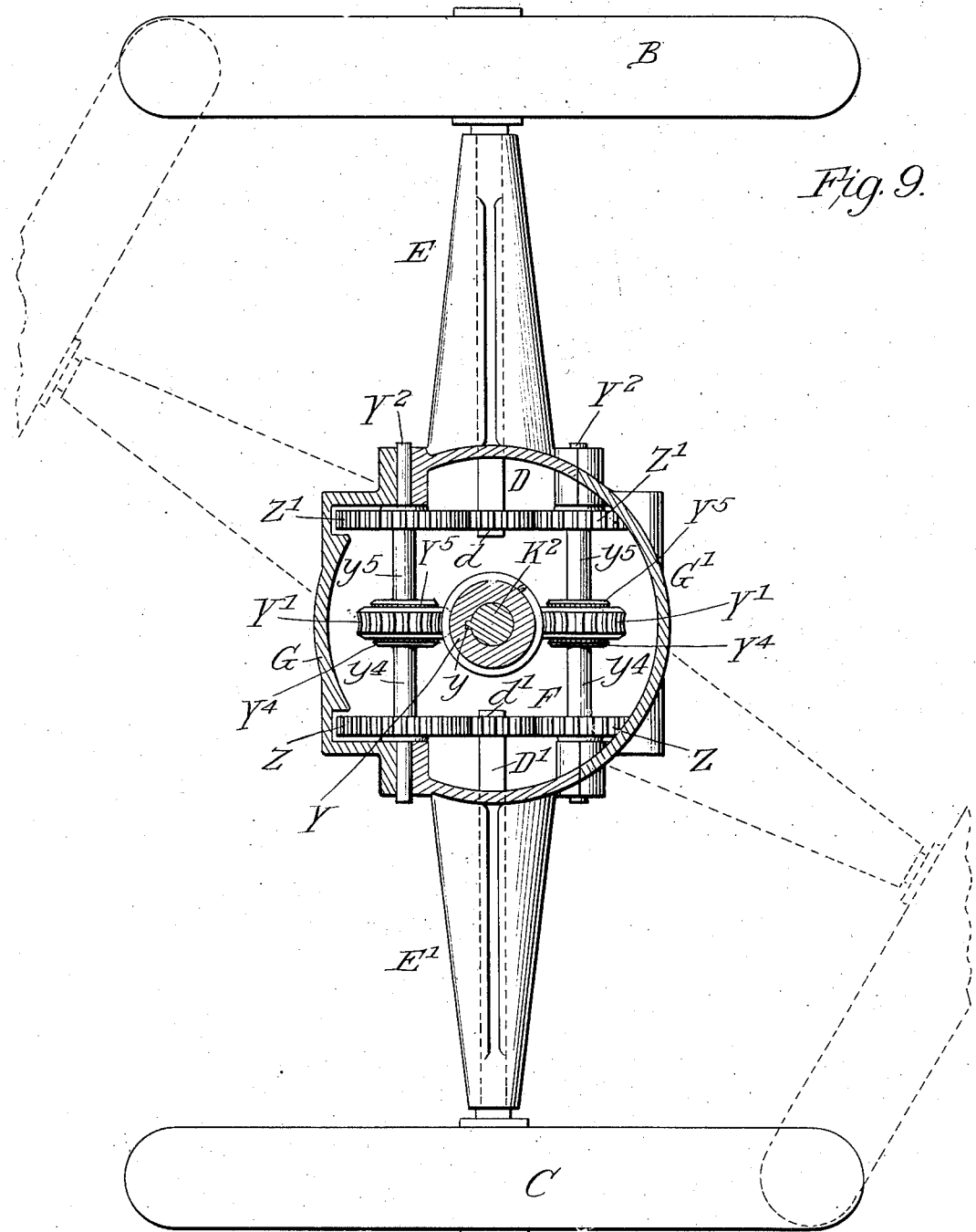

H. H. SCHIELER.
TRANSMISSION AND STEERING MECHANISM FOR MOTOR DRIVEN VEHICLES.
APPLICATION FILED MAR. 16, 1912.
1,079,607.
Patented Nov. 25, 1913.
6 SHEETS—SHEET 5.
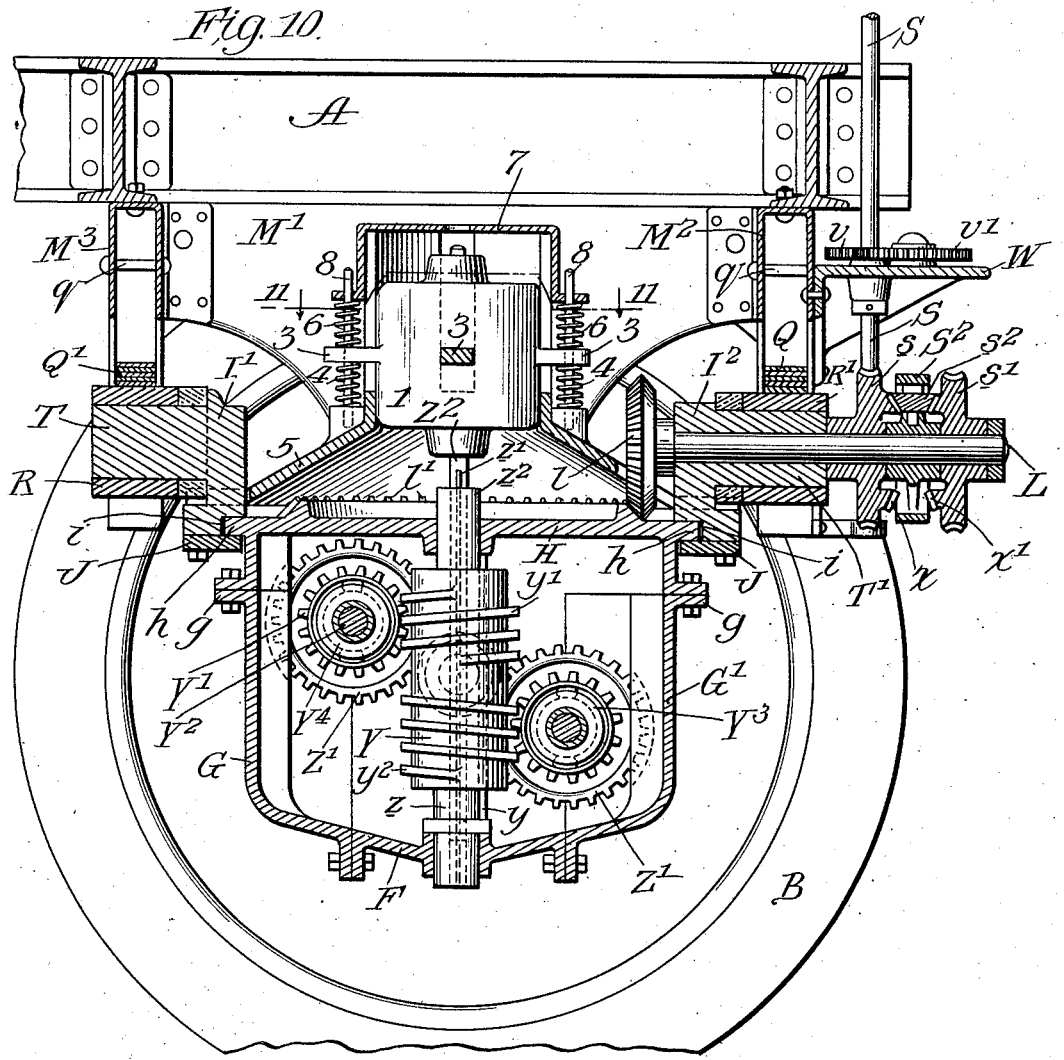
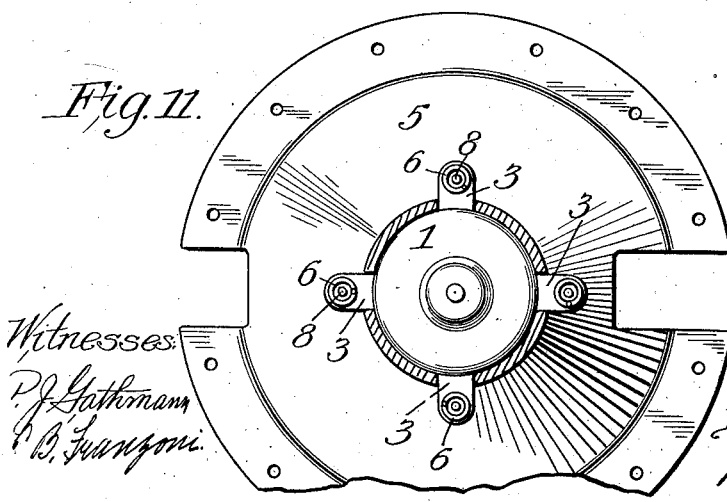
Witnesses
Inventor:
H. H. Schieler.
By his Attorneys

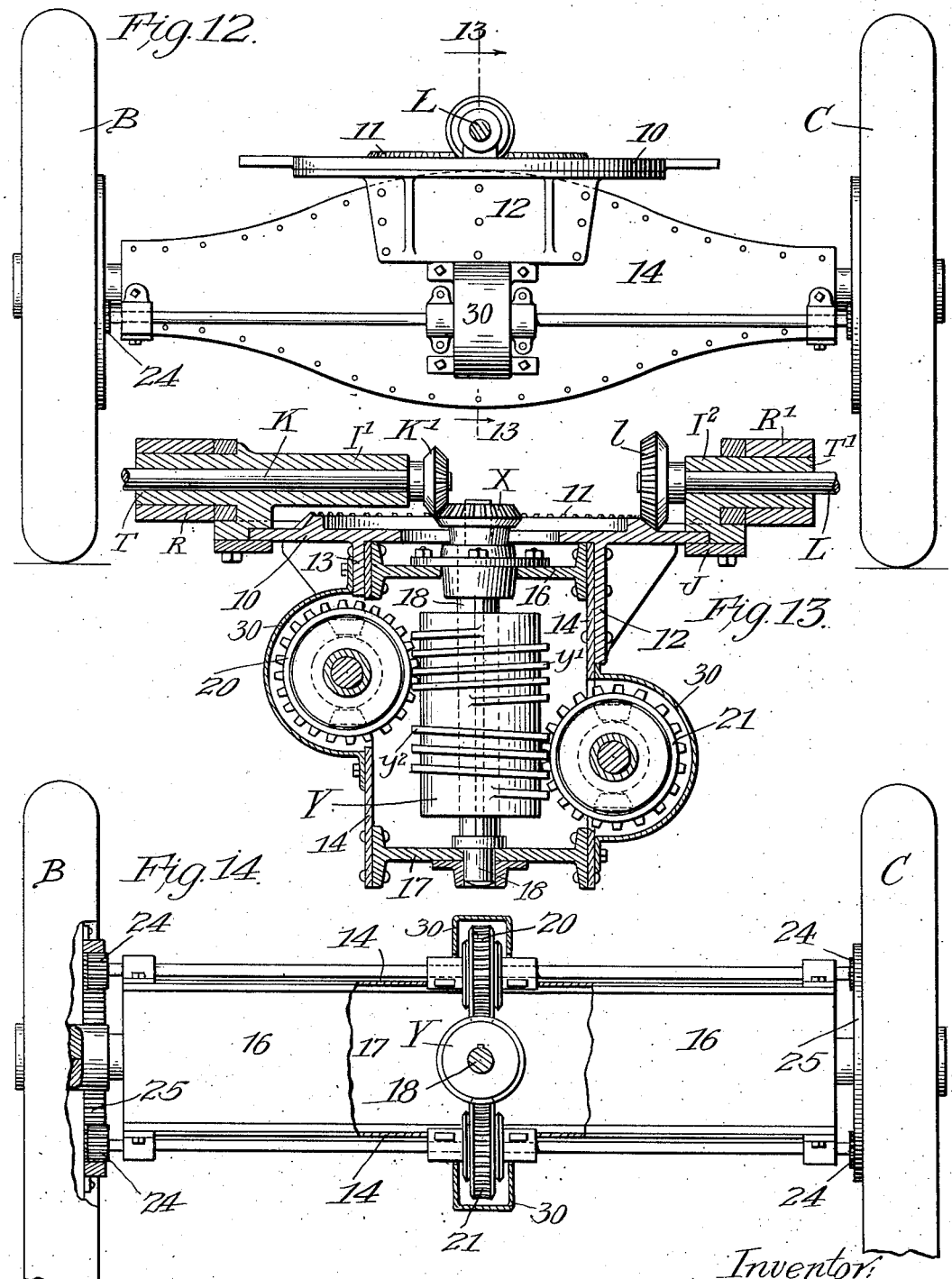

UNITED STATES PATENT OFFICE.

HARRY H. SCHIELER, OF MEADOWS, IDAHO, ASSIGNOR OF FOUR-TENTHS TO THOMAS BENTON SNYDER, OF MEADOWS, IDAHO, AND TWO-TENTHS TO NATHAN H. HALL, OF ST. LOUIS, MISSOURI.

TRANSMISSION AND STEERING MECHANISM FOR MOTOR-DRIVEN VEHICLES.

1,079,607. Specification of Letters Patent. Patented Nov. 25, 1913.

Application filed March 16, 1912. Serial No. 684,236.

*To all whom it may concern:*

Be it known that I, HARRY H. SCHIELER, a citizen of the United States, residing at Meadows, in the county of Adams and State of Idaho, have invented certain new and useful Improvements in Transmission and Steering Mechanism for Motor-Driven Vehicles, of which the following is a specification.

My invention relates to automobile vehicles of the class in which the motive power is connected to the front axle, to which the steering mechanism is also applied. Trucks or wagons for heavy loads, fire engines and other like vehicles can advantageously be equipped with driving and steering mechanism of this kind, and the object of my invention is to so construct such mechanism that the motive power may be transmitted with the highest efficiency and the vehicle may be easily steered without in any way interfering with the transmission gears.

It is important that there should be a spring or yielding connection between the axle and the vehicle body, and that the axle should be free to oscillate or rock vertically as well as to swing to a sufficient extent to allow the vehicle to be turned quickly without interference with the driving gear, and mechanisms for accomplishing these results form important features of my invention. It is also important that the motive power should be transmitted to the axle with the least possible friction or binding action; that the road wheels should be capable of being driven differentially; that means should be provided for preventing the actuation of the steering mechanism by any vertical movement of the body relatively to the wheels; and that the mechanism should be so arranged that it may be easily taken apart or applied to and separated from the vehicle. These desirable features are embodied in my improvements which are illustrated in the accompanying drawings, in which—

Figure 1:
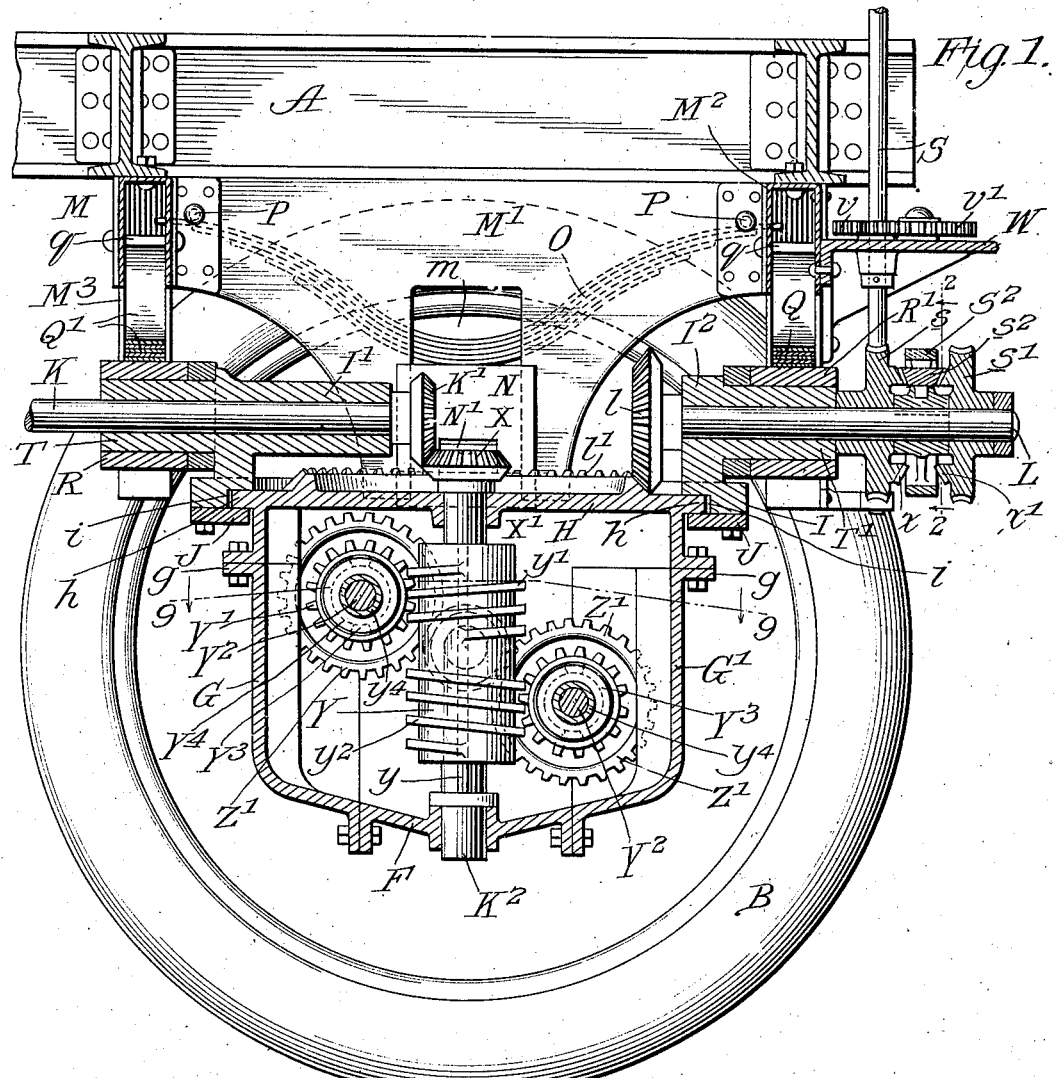
Figure 2:
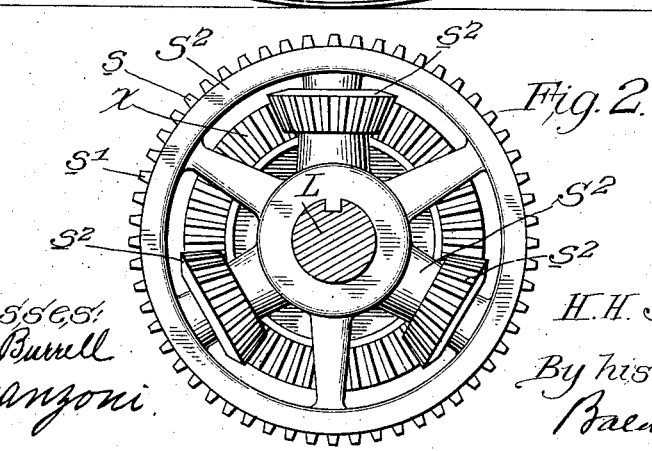

Figure 1 shows a vertical central section through the front part of a vehicle body to which my improvements are attached. Fig. 2 is a detail view of part of the steering mechanism. Fig. 3 shows a front elevation of the principal parts of the mechanism shown in Fig. 1. Fig. 4 is a detail sectional view, showing how differential gearing may be applied to the driving mechanism to allow the road wheels on the front axle to move at different speeds when the vehicle is being turned. Fig. 5 is a plan view taken below the vehicle body of the pedestal frame and some of the mechanism connected therewith. Fig. 6 is a perspective view of the annular spring supporting frame from which the housing of the front axle and part of the gearing is hung and which is provided with trunnions having tubular bearings for the motor-driven shaft and the horizontal shaft of the steering mechanism. Fig. 7 is a perspective view of one of the spring-supporting blocks arranged in the sides of the pedestal frame. Fig. 8 is a perspective view of one of the spring-supporting blocks arranged in the front and rear members of the pedestal frame. Fig. 9 shows a transverse section on the line 9—9 of Fig. 1, and illustrates how the two members of the divided front axle are driven. Fig. 10 is a view similar to Fig. 1 but showing how an electric motor may be located over the front axle and geared thereto. Fig. 11 shows a transverse section on the line 11—11 of Fig. 10, and illustrates particularly the construction of the frame which supports the motor. Fig. 12 shows a front elevation of a modified construction in which the motor shaft is connected with internal gears applied to the road wheels. Fig. 13 is a detail view, on an enlarged scale, showing the gearing partly illustrated in Fig. 12. Fig. 14 is another view of the mechanism shown in Fig. 12, partly in plan and with parts broken away.

In the first nine figures of the drawings I have shown a construction in which the body A of the vehicle is constructed of I-beams, suitably arranged and connected, although of course my invention is not limited to such construction. The motor, of any suitable kind, may be located at any convenient place either above or below the body, but preferably below it. I have shown only the front axle and front wheels of the vehicle as my invention does not pertain to the rear axle and wheels, my purpose being to apply power only to the front axle although it is obvious that power may be applied also to the rear axle if so desired. The front axle, which carries the road wheels, B and C, is divided into two members D and D', to the outer ends of which the road wheels are secured. The two members of the axle are in line with each other, their inner ends terminating a considerable distance apart to accommodate the gearing hereinafter described. The axle members have bearings in tubular casings E, E' forming part of a centrally arranged casting F which has bolted to it two removable sections G and G' and the three parts F, G and G', which constitute a housing are flanged at $g$ and bolted to a correspondingly flanged cover H, which is formed with an outwardly projecting top flange $h$ that enters an annular groove $i$ in the underside of an annular supporting frame I. An annular plate J is bolted to the supporting frame I below the flange $h$ and supports the housing but permits the latter to turn relatively to the supporting frame, which frame I, as clearly shown in Fig. 6, is formed with a trunnion I' through which the motor-driven shaft K extends and a trunnion $I^2$ through which extends the horizontal shaft L forming part of the steering mechanism.

To the underside of the front portion of the vehicle body A is secured a pedestal frame M, which is clearly shown in side and front elevation in Figs. 1 and 3 and in plan in Fig. 5. This pedestal frame comprises two side members M', a front member $M^2$ and a rear member $M^3$. They are all of practically the same construction and contain the springs which form the yielding connection between the vehicle body and the axle. The side pedestals M', as shown in Fig. 1, have openings $m$ which receive spring-supporting blocks N of the kind shown in Fig. 7. These blocks are formed with vertical flanges $n$ and are adapted to move up and down in the openings $m$ of the side pedestals. The side springs O rest on the top of these blocks, the ends of the springs being under bolts P secured to the side members of the pedestal. The blocks N carry rollers N' which rest on arms $i'$ extending sidewise from the annular supporting frame I, and the arrangement is such that the vehicle body may tilt or the axle may tilt relatively to the vehicle body without undue friction while the springs are free to act in the usual way. In like manner the front and rear springs Q, Q' are mounted within the front and rear members $M^2$, $M^3$ of the pedestal frame. The outer ends of the springs pass under bolts $q$ attached to the pedestal members while the lower middle portions of the springs rest on blocks R, R' of the kind shown in Fig. 8 and which are adapted to move up and down in openings $r$ formed in the pedestal members $M^2$, $M^3$ in which they are properly guided by the flanges.

The trunnions I', $I^2$ of the frame I have portions T, T' which constitute journals which allow the axle to oscillate or rock in a vertical plane to any desired extent. The rear journal T extends through a centrally arranged opening in the rear block R, while the front journal T' extends through an opening in the front block R'. The shafts K and L extend through the trunnions as shown in Fig. 1, and these shafts are arranged in the central longitudinal axis of the vehicle and directly above the axis about which the front axle oscillates. By this construction the front wheels and front axle are properly connected to the vehicle body in such manner that the axle may be swung in either direction to any desired extent to turn the vehicle quickly, and the axle may tilt or oscillate to accommodate itself to inequalities in the road without undue strain in the connections, and as will be hereinafter shown the construction is also such that the driving and steering gear are not interfered with by such movements of the axle.

In order to steer, I preferably employ the mechanism shown where, as will be observed, the horizontal shaft L of the steering mechanism is connected by a bevel gear $l$ with an annular series of teeth $l'$ formed on the flanged cover H of the housing. It is obvious that by turning the housing the axle will be correspondingly turned. The shaft L is connected with a steering shaft S, preferably in the manner illustrated; that is to say, the shaft L carries two worm wheels $s$, $s'$ which are loose on said shaft. Between these worm wheels is interposed a pinion-carrying wheel $S^2$ carrying a plurality of pinions $s^2$ which mesh with the teeth $x$, $x'$ of the worm wheels $s$, $s'$. This pinion-carrying wheel $S^2$ is fast on the shaft L. The shaft S carries at its lower end a worm wheel V which meshes with the worm wheel $s$ and the shaft S also carries a spur wheel $v$ meshing with an intermediate wheel $v'$, in turn meshing with a spur wheel $v^2$ secured to another worm shaft V' which gears with the worm wheel $s'$. The steering mechanism is supported by a bracket W, attached to the front member $M^2$ of the pedestal. This mechanism constitutes a compensating gear, and the construction is such that when the shaft S is turned in either direction to operate both worms V, V' motion will be imparted to the pinion-carrying wheel $S^2$ about the axis of the shaft L and such shaft will be turned to steer the vehicle, but any up and down movement which would cause the worms V, V' to rise and fall will not impart a rotary motion to the shaft L and hence the vertical movement of the vehicle body on its springs will have no effect on the steering gear because the vertical movement imparted to both worms counhas bearings in the upper and lower I-beams 16, 17, and the worm shaft is geared to the motor-driven shaft K by the gearing K', X illustrated which is similar to that shown in Fig. 1. The worm Y gears with worm wheels 20, 21 on opposite sides of the worm shaft and is inclosed in cases 30 attached to the plates 14. These wheels form part of differential gearing similar to that shown in Fig. 4 and which is connected in the same manner to pinions 24 which mesh with the internal gear 25 of the wheels B and C. In other respects the construction and operation are similar to those before described.

As usual, a high speed motor is employed and reducing gear is interposed between the motor and the axle. This gearing is of novel construction and is arranged close to the steering axle. The worm Y, in connection with the worm wheels and connected gearing, accomplishes this result, said worm being arranged to rotate about the axis around which the axle swings. In the construction shown in Fig. 10 the motor is arranged directly over the worm, is directly connected therewith and may be easily separated therefrom. The motor is so supported that the vehicle body can partake of its spring motion without moving the motor and the latter is in turn spring supported and oscillates or rocks with the axle. Not only can the axle and housing be easily separated from the supporting frame I, but the latter with the housing and connected parts attached may be easily removed from the pedestals. It will thus be seen that by providing a vehicle with a suitable pedestal frame having the characteristics of that shown my improved transmission and steering mechanism may be readily applied to vehicles of ordinary construction.

I claim as my invention:

1. In a motor-driven vehicle, the combination with the vehicle body, of a divided axle carrying road wheels, means for pivotally connecting the axle with the vehicle body to permit it to turn about a vertical axis perpendicular to and in the same vertical plane with the longitudinal central axis of the vehicle, a vertically arranged worm mounted to turn about an axis in line with the axis about which the axle swings and in the same vertical plane as the longitudinal axis of the axle, means for rotating said worm and gearing operated by the worm for driving the road wheels and which freely swings about the axis of the worm with the axle when steering without turning the worm.

2. In a motor-driven vehicle, the combination with the vehicle body, of a divided axle carrying road wheels, means for pivotally connecting the axle with the vehicle body to permit it to turn about a vertical axis perpendicular to the longitudinal central axis of the vehicle, a vertically arranged worm mounted between the inner ends of the divided axle and arranged to turn about an axis in line with the axis about which the axle swings and in the same vertical plane as the longitudinal axis of the axle, means for rotating said worm and differential gearing operated by the worm for driving the road wheels and which freely swings around the axis of the worm with the axle when steering without turning the worm.

3. In a motor-driven vehicle, the combination with the vehicle body of an axle carrying road wheels, means for pivotally connecting the axle with the vehicle body to permit it to turn about a vertical axis perpendicular to the longitudinal central axis of the vehicle, a vertically arranged worm shaft carrying oppositely disposed worms and mounted to turn about an axis in line with the axis about which the axle swings, means for rotating said worm, and gearing operated by the worm for driving the road wheels and which freely swings around the axis of the worm with the axle when steering.

4. In a motor-driven vehicle, the combination with the vehicle body, of a divided axle carrying road wheels, means for supporting and connecting the axle members and for pivotally connecting them with the vehicle body to permit them to turn about a vertical axis perpendicular to the longitudinal central axis of the vehicle, a vertically arranged worm mounted between the inner ends of the divided axle and arranged to turn about an axis in line with the axis about which the axle swings and in the same vertical plane as the axis of the axle, means for rotating said worm, differential gearing operated by the worm for driving the road wheels and which freely swings about the axis of the worm with the axle when steering without turning the worm and springs interposed between the vehicle body and the axle supports.

5. In a motor-driven vehicle, the combination with the vehicle body of a divided axle carrying road wheels, means for supporting the axle members and for pivotally connecting them with the vehicle body to permit them to turn about a vertical axis perpendicular to the longitudinal central axis of the vehicle, a vertically arranged worm shaft mounted to turn about an axis in line with the axis about which the axle swings, means for rotating said worm, worm wheels engaging the oppositely disposed worms on opposite sides of the axis of the worm shaft, and gearing connecting each of said worm wheels with both of the axle members.

6. In a motor-driven vehicle, the combination with the vehicle body of a divided axle carrying road wheels, means for pivotally terbalances or counteracts each other and the shaft L is not rotated. I believe that it is new with me to employ compensating gearing of this kind in the steering mechanism of motor vehicles for the purpose specified.

The front axle, as before stated, is divided into two members D, D' and these are connected with the motor-driven shaft K in a novel way. The shaft K carries a beveled pinion K' which meshes with a beveled pinion X on a vertically arranged worm shaft K² which has an upper bearing in the cover H of the housing and a lower bearing in the lower part of the casting F, as clearly shown in Fig. 1. The axis of this shaft is perpendicular to the axis of the motor-driven shaft K and is in line with the axis about which the front axle swings. The worm shaft carries a worm sleeve Y which is free to move endwise on the worm shaft but which is connected therewith by a spline $y$. That part of the worm sleeve Y above the axis of the axle members is formed with a worm thread $y'$ turned in one direction while the lower part of the sleeve below the axis of the axle is formed with a worm thread $y^2$ disposed in the opposite direction. The worm $y'$ meshes with a worm wheel Y' on a horizontally arranged shaft Y² mounted in bearings in the section G of the housing and this worm wheel carries pinions Y³ which mesh with bevel gears Y⁴, Y⁵ formed on sleeves $y^4$, $y^5$ which carry spur wheels Z, Z' which, as shown in Fig. 9, mesh with pinions $d$, $d'$ attached to the axle members D, D'. In like manner the worm $y^2$ below the axis of the front axle and on the opposite side thereof is geared in a similar way to the spur wheels $d$, $d'$. The arrangement of pinions and wheels Y³, Y⁴, Y⁵, etc., shown in Fig. 4, constitutes a differential gearing of well known type, and it is clear that when the worm is rotated about its vertical axis motion will be transmitted to the two members of the axle so as to cause them to turn in the same direction but by reason of the differential gearing employed when the axle is swung, as indicated in Fig. 9, the road wheel which swings outward and forward can move at a greater speed than its companion wheel without interference.

An important feature of the construction shown is that the strain on the worm sleeve is balanced. If only one worm were employed and this meshed with a single worm wheel there would be a tendency for the worm to move endwise in its bearings and cause an end thrust producing a binding action and a very objectionable friction but by the arrangement shown where two worms are employed on the same sleeve this tendency is counteracted and the worm is made to float, as it were, between the two worm wheels endwise thrust being thus entirely avoided. The differential gearing and the worm gearing is contained within the housing which, with the axle members, may be turned or swung in either direction and may also rock or oscillate in a vertical plane without disturbing the relation of the members of the gearing and inasmuch as the transmission mechanism is located a considerable distance below the vehicle body the wheels may be turned around to an angle of 90° or to any other desired angle to quickly turn the vehicle. It will be observed also that the sections G, G' of the housing may be easily removed for inspection or repair and when these sections are removed the different parts of the gearing may be separated if desired. By merely removing the ring J and supporting the vehicle body the front axle with its wheels and the housing may be withdrawn from the vehicle, and in like manner the supporting frame I may be detached if desired as the parts connecting it with the pedestal may be easily separated.

In the modification shown in Fig. 10 the construction for the most part, is substantially the same as that before described but in this case the trunnion T is made solid and the motor-driven shaft K is omitted, an electric motor 1 being employed to operate the worm shaft and this motor is located directly over the worm shaft. As shown, the worm sleeve Y is free to move vertically or endwise on the worm shaft $z$, which latter is also free to move vertically and has a sliding connection $z'$ with the shaft Z² of the armature of the electric motor 1. This motor is provided with laterally projecting arms 3 which rest on springs 4 supported by a frame 5 attached to the supporting frame I, and said arms 3 carry springs 6 on which the removable upper frame 7 of the motor rests. Rods 8 extend through the springs of the part 7 of the frame and are connected with the frame 5. By this arrangement the motor is yieldingly supported and the axle may turn and swing, as well as move vertically relatively to the vehicle body, without interfering with the connection between the motor and the axle. In other respects the construction shown in Fig. 10 is the same as that before described.

In Figs. 12, 13 and 14, I have shown a construction in which internal gears on the road wheels are connected with the worm Y in accordance with the principles of my invention. The housing for the gearing and for the worm is somewhat modified. In this case a plate 10, carrying the teeth 11, meshing with the pinion $l$ of the steering shaft L, is provided with depending brackets 12, 13, to which metal plates 14 are bolted and to the inner sides of the upper and lower portions of these plates are secured I-beams 16, 17. The worm shaft 18 connecting the axle members with the vehicle body to permit them to turn about a vertical axis perpendicular to the longitudinal central axis of the vehicle, a vertically arranged worm shaft mounted to turn about an axis in line with the axis about which the axle members swing and which is provided with oppositely disposed worms, means for rotating said worm, worm wheels geared to the worms, and gearing connecting one of said worm wheels with each axle member on one side of the axis of the axle, and other gearing connecting the other worm wheel with the axle members on the other side of the axis of the axle.

7. In a motor-driven vehicle, the combination with the vehicle body, of a housing supported by the vehicle body and mounted to turn about a vertical axis perpendicular to the longitudinal central axis of the vehicle, means for pivotally connecting the housing with the vehicle body to permit said housing to swing about an axis in line with the longitudinal central axis of the vehicle body, a divided axle carrying road wheels, a vertically arranged worm in line with the axis about which the axle swings and in the same vertical plane as the axle, differential gearing connecting the worm with the axle and a detachable section in the housing removable for inspection and repair.

8. In a motor-driven vehicle, the combination with the vehicle body of an axle carrying road wheels, a vertically arranged worm having gearing connecting it with the axle and arranged in line with the axis about which the axle swings, a housing for said worm and gearing, and a frame suspending said housing and having a rocking connection with the vehicle body arranged in line with the central longitudinal axis of the vehicle.

9. In a motor-driven vehicle, the combination with the vehicle body of an axle carrying road wheels, a vertically arranged worm having gearing connecting it with the axle, a housing for said worm and gearing, a horizontally arranged frame for suspending said housing, and trunnions on said frame mounted in bearings the axis of which is perpendicular to the axis of the worm.

10. In a motor-driven vehicle, the combination with the vehicle body of an axle carrying road wheels, a vertically disposed worm mounted to turn about an axis in line with the axis about which the axle swings and which is geared to the axle, a sectional housing having a part in which the worm is mounted to turn and having removable parts to permit access to the gearing, a flanged top for the housing, a horizontally arranged frame which supports the housing and relative to which the housing may turn about a vertical axis, and a rocking connection between said supporting frame and the vehicle body arranged in line with the longitudinal central axis of the vehicle.

11. In a motor-driven vehicle, the combination with the vehicle body, of an axle carrying road wheels, a vertically arranged worm mounted to turn about an axis in line with the axis about which the axle swings and which is geared to the axle, a housing inclosing the worm and gearing, a horizontal frame which supports the housing and relatively to which the housing may turn about a vertical axis, a rocking connection between said supporting frame and the vehicle body in line with the central longitudinal axis of the vehicle, and a motor-driven shaft geared with the worm rotating about the axis on which the supporting frame rocks and which is held in gear with the worm in whatever direction or to whatever extent the axle may be swung or rocked.

12. In a motor-driven vehicle, the combination with the vehicle body of an axle carrying road wheels, a housing supporting the axle, a motor-driven shaft, gearing connecting the motor-driven shaft with the axle, a rocking connection between the housing and the vehicle body in line with the central longitudinal axis of the vehicle, a horizontally arranged shaft geared with the housing for turning the latter about a vertical axis in line with the axis about which the axle swings, a steering shaft, and compensating gearing connecting the steering shaft with the shaft geared to the housing.

13. In a motor-driven vehicle, the combination with the vehicle body of an axle carrying road wheels, a housing supporting the axle, a horizontally arranged shaft geared with the housing for turning it about an axis in line with the axis about which the axle swings, worm wheels loose on said shaft, worms on opposite sides of said shaft gearing with said worm wheels, means for turning said worms, and a pinion-carrying wheel fast on said shaft and gearing with the worm wheels thereon.

14. In a motor-driven vehicle, the combination with the vehicle body of an axle carrying road wheels, springs interposed between the axle and the vehicle body and yieldingly supporting the latter, and steering mechanism connected with the axle comprising a steering shaft movable vertically with the vehicle body, a shaft geared with the axle, worm wheels loosely mounted on said shaft, a pinion-carrying wheel fast on said shaft and gearing with the worm wheels, worms on opposite sides of said shaft gearing with the worm wheels, and gearing connecting the steering shaft with said worms.

15. In a motor-driven vehicle, the combination with the vehicle body of a pedestal frame carrying the vehicle-supporting springs, a frame vertically movable relatively to the pedestal and supporting the springs, road wheels, their axle, a housing for the axle detachably connected with said supporting frame, a vertically arranged worm geared with the axle, having its axis in line with the axis about which the axle swings, and means for rotating said worm.

16. In a motor-driven vehicle, the combination with the vehicle body of a pedestal frame detachably connected with the underside thereof, springs arranged in the pedestal frame, a horizontally arranged frame for supporting the springs, an axle carrying road wheels, a vertically arranged worm geared with the axle and having its axis arranged in line with the axis about which the axle swings, a motor-driven shaft for operating said worm, a housing supporting the axle and detachably connected with said spring-supporting frame, and a rocking connection between said spring-supporting frame and the pedestal frame arranged in the central longitudinal axis of the vehicle.

17. In a motor-driven vehicle, the combination with a high speed motor, of a divided steering axle carrying road wheels and reducing gearing connecting the motor with the two members of the axle comprising a worm arranged in the same vertical plane as the longitudinal axis of the axle and mounted to turn about the axis on which the axle swings, and differential gearing connecting the worm with the axle which freely swings around the axis of the worm with the axle when steering without turning the worm.

18. In a motor-driven vehicle, the combination with the steering axle of a motor arranged over the axle, a frame on which the motor is yieldingly supported, body springs interposed between said frame and the vehicle body, a rocking connection between said frame and the vehicle body and reducing gear interposed between the motor and the axle comprising a vertically arranged worm mounted to turn about the axis on which the axle swings, and gearing connecting said worm with the axle.

19. In a motor driven vehicle, the combination with the vehicle body of an axle carrying road wheels, means for supporting the axle and connecting it with the vehicle body and which include body supporting springs, a vertically arranged worm geared to the axle, a motor arranged directly over the worm and having a sliding connection therewith, and means for spring supporting the motor whereby the latter may move vertically relatively to the worm.

20. In a motor driven vehicle, the combination with the vehicle body of a divided axle carrying road wheels, means for pivotally connecting the axle with the vehicle body to permit it to swing about a vertical axis, a vertically arranged worm mounted to turn about an axis in line with the axis about which the divided axle swings, means for rotating said worm and differential gearing operated by the worm for driving the road wheels and which freely swings around the axis of the worm with the axle when steering without opposing or being opposed by the rotation of the worm.

In testimony whereof, I have hereunto subscribed my name.

HARRY H. SCHIELER.

Witnesses:
 LLOYD B. WIGHT,
 M. E. BURRELL.